United States Patent
Hindi

(10) Patent No.: US 11,078,624 B2
(45) Date of Patent: Aug. 3, 2021

(54) METHOD FOR ISOLATING ALPHA CELLULOSE FROM LIGNOCELLULOSIC MATERIALS

(71) Applicant: King Abdulaziz University, Jeddah (SA)

(72) Inventor: Sherif Shawki Zaki Hindi, Jeddah (SA)

(73) Assignee: King Abdulaziz University, Jeddah (SA)

( * ) Notice: Subject to any disclaimer, the term of this patent is extended or adjusted under 35 U.S.C. 154(b) by 130 days.

(21) Appl. No.: 16/137,821

(22) Filed: Sep. 21, 2018

(65) Prior Publication Data

US 2020/0095728 A1    Mar. 26, 2020

(51) Int. Cl.
  *D21C 9/16*    (2006.01)
  *D21C 5/02*    (2006.01)
  *D21C 7/00*    (2006.01)

(52) U.S. Cl.
  CPC ............ *D21C 9/163* (2013.01); *D21C 5/022* (2013.01); *D21C 9/16* (2013.01); *D21C 7/00* (2013.01)

(58) Field of Classification Search
  CPC . D21C 5/02; D21C 5/022; D21C 9/16; D21C 9/163; D21C 7/00
  See application file for complete search history.

(56) References Cited

U.S. PATENT DOCUMENTS

| | | | |
|---|---|---|---|
| 5,755,925 A * | 5/1998 | Kogan | D21C 5/02 162/6 |
| 9,133,227 B2 | 9/2015 | Azuma et al. | |
| 10,865,519 B2 * | 12/2020 | Nonni | D21C 3/26 |
| 2013/0203699 A1 * | 8/2013 | Nonni | D21H 11/20 514/57 |

FOREIGN PATENT DOCUMENTS

| | | |
|---|---|---|
| CN | 103924468 A | 7/2014 |
| CN | 105297511 A | 2/2016 |
| EP | 401 149 A1 | 12/1990 |

OTHER PUBLICATIONS

Quantum Technologies Inc, Mark V Mixer/reactor [downloaded from archive.org], Apr. 17, 2004 and Jun. 14, 2004 [downloaded on Jul. 16, 2020] (Year: 2004).*
SMOOK, Handbook for Pulp and Paper Technologists, 1992, Angus Wilde Publications, 2nd edition, chapter 14. (Year: 1992).*
(Continued)

*Primary Examiner* — Anthony Calandra
(74) *Attorney, Agent, or Firm* — Oblon, McClelland, Maier & Neustadt, L.L.P.

(57) ABSTRACT

The present invention involves an environmentally friendly process and apparatus for the delignification of lignin-containing materials, such as cardboard newspaper or agricultural or tree pruning wastes. This process produces cellulose using low temperatures and low concentrations of hydrogen peroxide. It can be performed using a column fitted with a semipermeable gasket that pressurizes the column by retaining oxygen released by action of the hydrogen peroxide on a lignin-containing material.

16 Claims, 9 Drawing Sheets

(56) References Cited

OTHER PUBLICATIONS

QuantumTechn, Mark V Laboratory Pulp Mixer and Ozone Caddy Mixing Pulp (youtube video https://www.youtube.com/watch?v=4XqPLWabmWQ), Jan. 2011 [viewed online Nov. 13, 2020], (Year: 2011).*

Sun, et al. ; Delignification of rye straw using hydrogen peroxide ; Industrial Crops and Products, vol. 12, Issue 2, pp. 71-83 ; Aug. 2000 ; Abstract Only ; 3 pages.

Kim, et al. ; Pretreatment of Wastepaper and Pulp Mill Sludge by Aqueous Ammonia and Hydrogen Peroxide ; Twenty-First Symposium on Biotechnology for Fuels and Chemicals ; Parts of the Applied Biochemistry and Biotechnology book series ; pp. 129-139 ; Sep. 17, 2012 ; Abstract Only ; 4 pages.

Taherzadeh, et al ; Pretreatment of Lignocellulosic Wastes to Improve Ethanol and Biogas Production: A Review ; International Journal of Molecular Sciences ; Sep. 1, 2008 ; 31 Pages.

* cited by examiner

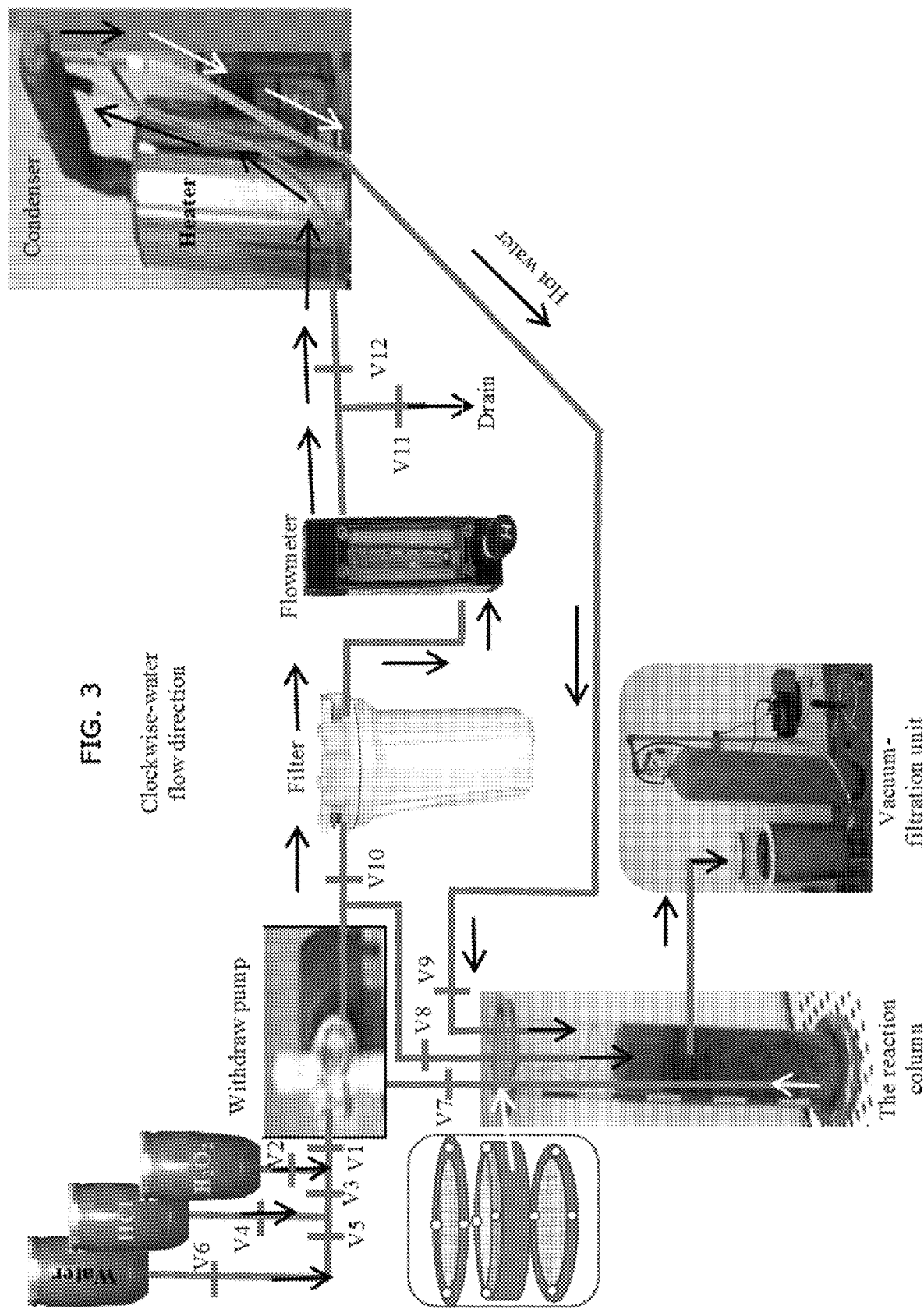

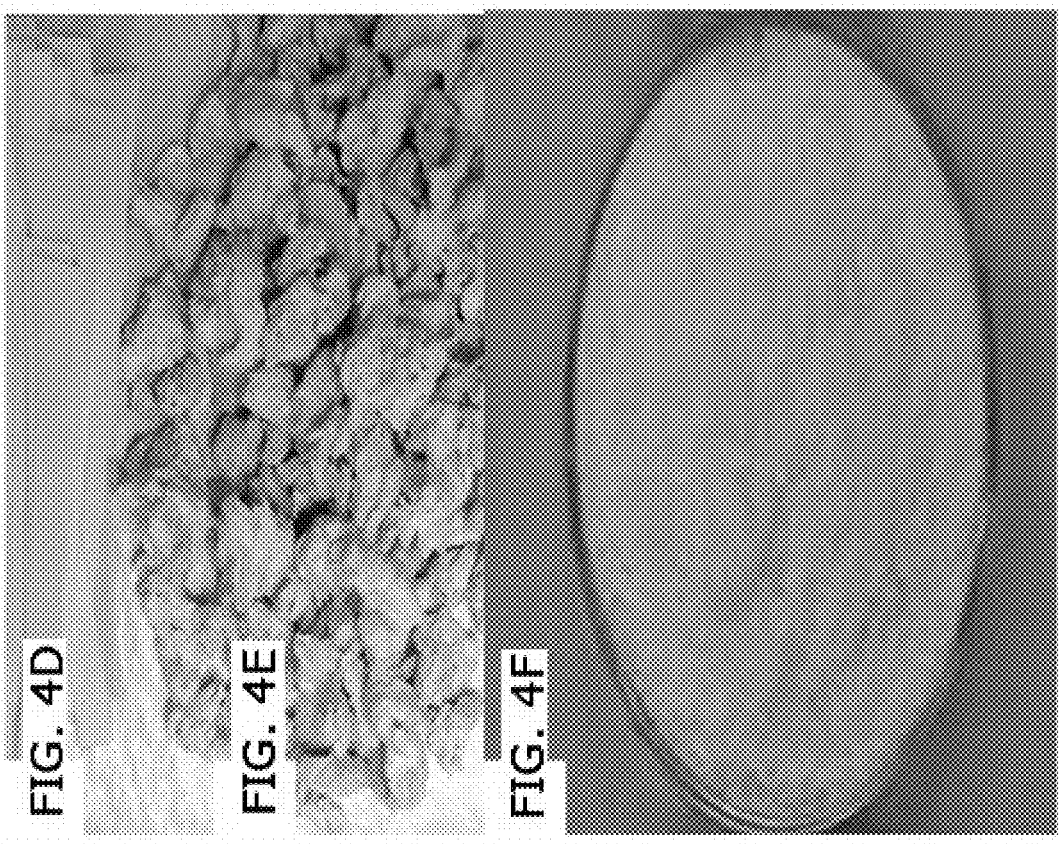
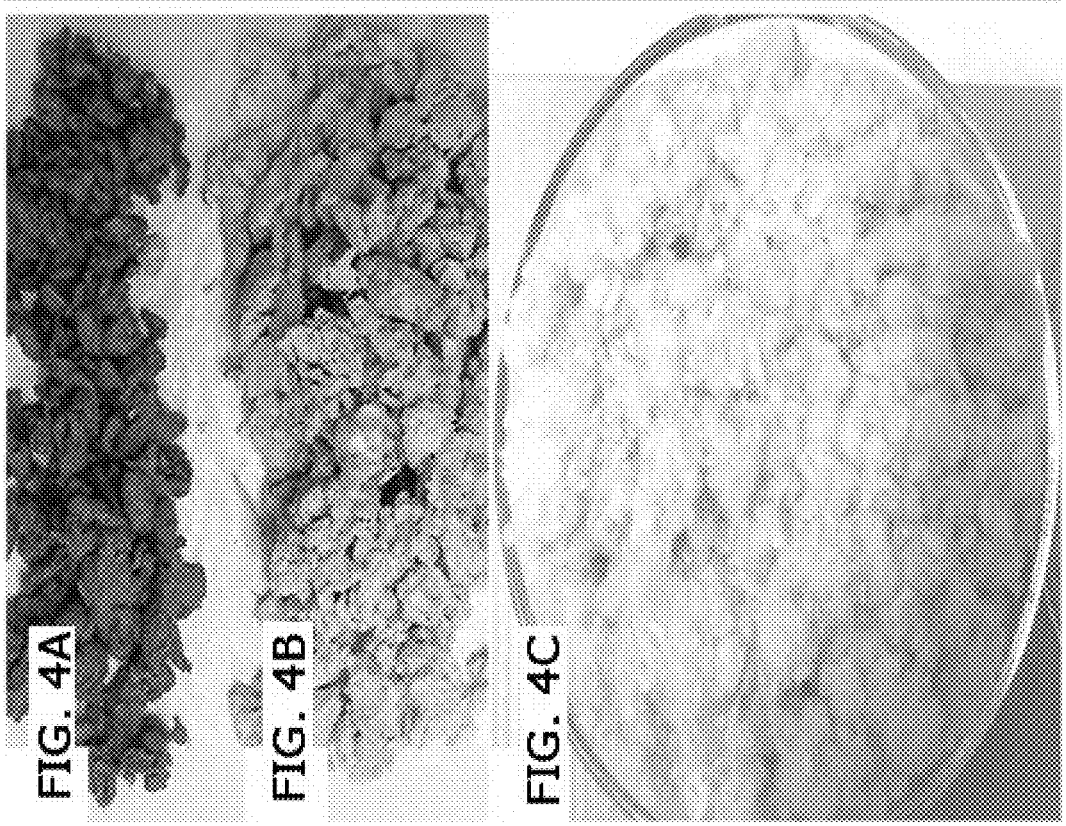

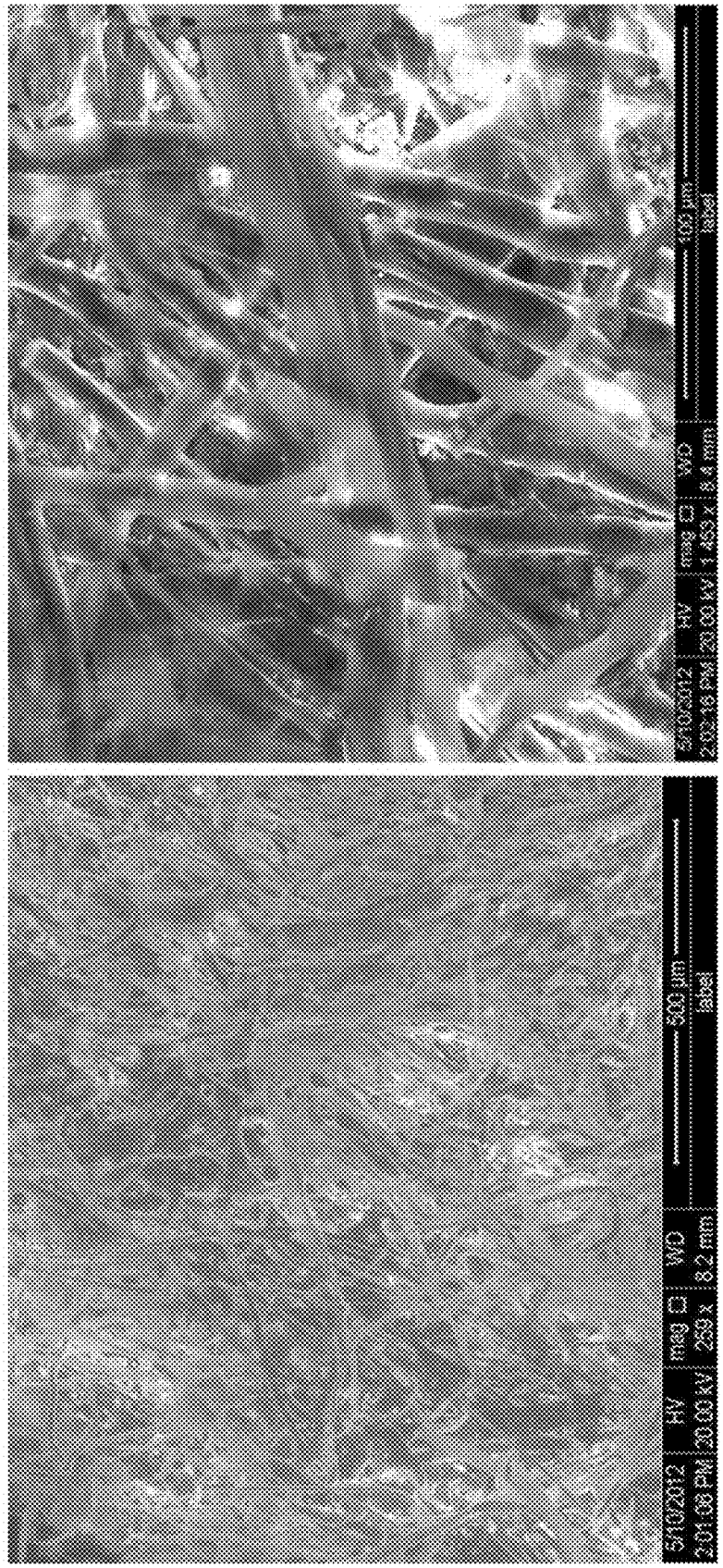

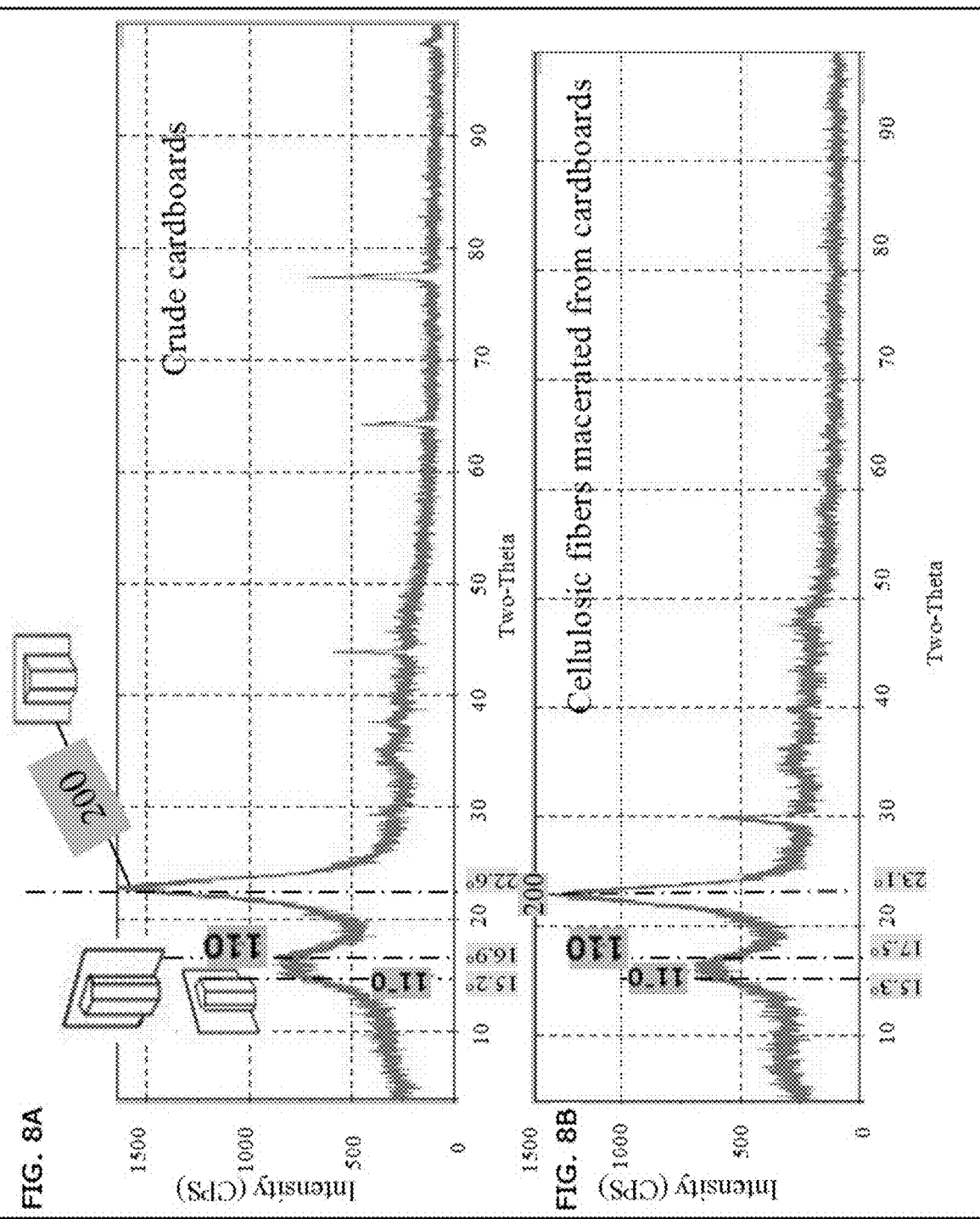

METHOD FOR ISOLATING ALPHA CELLULOSE FROM LIGNOCELLULOSIC MATERIALS

BACKGROUND OF INVENTION

Field of the Invention

The present invention falls within the fields of cellulose chemistry and technology. Among its other aspects, it is directed to an environmentally friendly process and apparatus for the delignification of lignin-containing materials, such as cardboard newspaper or agricultural or tree pruning wastes. This process produces cellulose using low temperatures and low concentrations of hydrogen peroxide. It can be performed using a column fitted with a semipermeable gasket that pressurizes the column by retaining oxygen released by action of the hydrogen peroxide on a lignin-containing material.

Description of the Related Art

Natural cellulose fibers have a variety of advantageous intrinsic properties such as biodegradability and other environmentally friendly features, processability, flexibility as well as other useful physico-mechanical properties. These cellulose fibers are readily available and can be produced from readily available natural materials including recycled newspaper or cardboard or from agricultural wastes. For example, palms are sources of biomass containing cellulose and lignin which may be obtained from palm trunks, frond bases, frond midribs, leaflets, coirs, fruit stems, date stones, and fruit empty bunches. The seasonal pruning of palms provides substantial quantities of biomass. In Saudi Arabia alone, the annual wastes resulting from date palm biomass are estimated to be approximately 1 million metric tons; see Nasser, et al., *Chemical Analysis of Different Parts of Date Palm (Phoenix dactlifera L.) Using Ultimate, Proximate and Thermo-Gravimetric Techniques for Energy Production*, Energies 9:374 (2016, incorporated by reference).

Natural cellulose fibers are employed in a number of fields including in the automotive industry, clothing manufacturing, pharmaceutical industry and in medicine. Cellulose fibers are used to reinforce polymers and to add particular functional properties to a product including those properties described and incorporated by reference to Thakur, V. K. and Thakur, M. K., 2004. *Processing and characterization of natural cellulose fibers/thermoset polymer composites*, Carbohydrate Polymers, 109: 102-117. DOI: 10.1016/j.carbpol.2014.03.039.

There are different forms of cellulose. Alpha cellulose is one of three recognized classes of cellulose, the others being beta and gamma cellulose. Alpha cellulose has the highest degree of polymerization and is the most stable. The other two classes, known as hemicelluloses, are beta cellulose and gamma cellulose.

Alpha cellulose is the major component of wood and paper pulp and can be separated from the other woody components by soaking pulp in a 17.5% solution of sodium hydroxide. Paper pulp that is high in alpha cellulose can be identified using Graff "C" stain, which will stain it pinkish red.

Alpha cellulose, which is usually pure white, is insoluble and can be filtered from the solution and washed prior to use in the production of paper, cellulose polymers or cellulosic materials. Papers, linens and cottons often contain high proportions of alpha cellulose and paper products containing a high percentage of alpha cellulose are generally stable and durable. Examples of common paper fibers that are high in alpha cellulose include cotton, flax, ramie, and kozo. Alpha cellulose pulps can be created from wood pulps using extended sulfite, or mercerized Kraft pulping methods. Pure cellulose is white and the paper made from it will be white and will resist yellowing that can be caused by oxidation of lignin. Oxidized lignin absorbs more light and darkens a paper product.

Lignin is a class of complex organic polymers that form important structural materials in the support tissues of vascular plants and some algae. Chemically, lignins are cross-linked phenolic polymers. Lignins are particularly important in the formation of cell walls, especially in wood and bark where they lend rigidity and confer resistance to rot. As a biopolymer, lignin is unusual because of its heterogeneity and lack of a defined primary structure. Its most commonly noted function is the support through strengthening of wood, mainly composed of xylem cells and lignified sclerenchyma fibers, in vascular plants. Lignin constitutes about 20-35% of the dry mass of wood. Newsprint, which must be produced as economically as possible, has more lignin in it than finer or more durable papers. Some types of paper advantageously contain lignin. Brown kraft paper, the dark brown paper used in grocery store bags which can be produced without bleaching, is stiff and sturdy because it has more lignin in it than white papers used for writing and printing which are produced by bleaching. To make a fine white paper, wood is put through a chemical solvent process which separates and removes the lignin.

Lignocellulosic fibers are constituted mainly from cellulose, lignin and hemicellulose as well as from pectin, pigments, organic extractives, and ash; see Hindi, S. S. Z. 2017, *The interconvertiblity of cellulose's allomorphs*. International Journal of Innovative Research in Science, Engineering and Technology (IJIRSET). 6 (1): 715-722. DOI: 10.15680/IJIRSET.2017.0601125 (incorporated by reference). Advantageously, they can be produced by pulping woody materials having low lignin content because this reduces pulping time and requires less processing, for example, it reduces the chemical charge necessary to process the fiber, see Diaz, M. J., Garcia, M. M., Eugenio, M. M., Tapias, R., Fernandez, M., and Lopez, F. 2007. *Variations in fiber length and some pulp chemical properties of leucine varieties*. Industrial Crops and Products, 26 (2): 142-150. DOI: 10.1016/j.indcrop.2007.02.003; Lopez, F., Garcia, M. M., Yanez, R., Tapias, R., Fernandez, M., and Diaz, M. J. 2008. *Leucine* species *valuation for biomass* and *paper production in 1 and 2 year harvest*, Bio resource Technology, 99 (11): 4846-4853. DOI: 10.1016/j.biortech.2007.09.048 (each incorporated by reference.) In contrast, the processing of materials having a higher lignin contents usually consumes greater amounts of chemicals; see Kristeva, P., Kordsachia, O. and Khider, T. 2005. *Alkaline pulping with additives of date palm rachis and leaves from Sudan*, Bioresource Technology, 96 (1): 79-85. DOI: 10.1016/j.biortech.2003.05.005 (incorporated by reference).

In view of shortage of traditional fibrous materials and increasing the demand for them, especially in Saudi Arabia, there has been an unmet need for a process that can efficiently and economically use agricultural residues, such as those resulting from annual pruning of date palms and other trees or bushes, as well as waste paper, such as recycled newsprint or cardboards. These lignocellulosic materials are widely available and annually accumulated in large amounts all over the world, especially in towns, making them a potential resource and precursor for production of cellulose. Currently, only a portion of waste paper and cardboard is reused, for example, by transformation into cardboard panels, egg containers, suspended ceiling boards and other structural building materials such as cement or gypsum boards. Such products containing recycled lignocellulosic materials are often only marginally profitable and sometimes unprofitable. Therefore, there is a demand to identify new, more profitable ways to exploit lignocellulosic fibers produced from agricultural wastes or recycling of paper and cardboard, including the production of finer papers or advanced cellulosic materials such as microcrystalline cellulose ("MCCs") or nanocrystalline cellulose ("NCCs"). A process that makes a more profitable product may also generate more jobs and boost the standard of living in communities producing the higher profit margin products.

Higher profit margin products generally require production of a finer paper or cellulosic product with less lignin and more cellulose in it. A significant problem of current methods that use lignocellulosic fibers, such as those from agricultural wastes or recycled newspaper or cardboard is the high lignin content of such materials. High lignin content of cardboard and newspaper arises from use of mechanical delignification methods instead of chemical delignification. Cardboard has a higher lignin content than newspaper because its fibers are separated from parent wood tissues mechanically, while newspaper a portion of chemical pulp is added to mechanically produced wood pulp. Besides calcium pectate, lignin is the main bender within cell walls. However, after destroying wood structure by fibrillation processes, the lignin loses is fractured into smaller molecular weight units and loses its bending ability. While cardboards and newspaper are good sources of cellulose for producing crystalline forms of cellulose or high-cellulose content fibers, chemicals or industrial products, it is inevitable that such raw materials be delignified for them to provide such products.

There are different pulping processes used to separate cellulosic fibers or for wood delignification, namely mechanical, chemical, thermo-mechanical, and organosolv methods. As explained above, the amount of alpha cellulose contained in a final fibrous product depends on the pulping process applied: chemical pulping yields the highest purity cellulose, while mechanical pulping gives fibrous products having a high lignin content.

The chemical pulping methods including Kraft, sulphite, and soda processes differ from each other according to the reagents/catalyst used. The Kraft technique uses concentrated NaOH and $Na_2S$ at elevated temperature (e.g., at 170° C.) and is the most applied industrially process for pulp and paper production. The sulfite process uses various salts of $H_2SO_3$, such as $SO_3^{2-}$ or $HSO_3^-$, to extract lignin from wood at an elevated temperature (e.g., at 170° C.). The selection of a salt depends on the pH of white liquor expected to be dominant. The counter ion used can be $Na^+$, $Ca^{2+}$, $K^+$, $Mg^{2+}$ or $NH_4^+$. Soda pulping uses NaOH as a delignification reagent and anthraquinone may be added to decrease carbohydrate degradation. This process gives pulp with lower tear strength than that obtained by sulfite and Kraft processes.

The organosolv process is a pulping technique that uses an organic solvent to solubilize lignin and hemicellulose. The Alcell™ process was examined as an organosolv pulping process using ethanol/water as a liquor; Pye, E. and Lora, J. 1991. *The Alcell process: a proven alternative to Kraft pulping*. Tappi Journal, 74 (3): 113-118.

Other specific delignification processes are known and include those of U.S. Pat. No. 9,133,227 B2 which describes a method for producing solubilized lignin by pulverizing a lignocellulosic material, defatting it using an organic solvent, and treating with hydrogen peroxide at a temperature of 80 to 200° C. under microwave radiation. CN103924468A, EP0401149A1, and CN105297511A and Sun, et al., Ind. Crops Products 12(2):71-83 (2000), Kim, et al., Twenty-first symposium on Biotechnology for Fuels and Chemicals, Applied Biochemistry and Biotechnology (2000), and Taherzadeh, et al., Int. J. Mol. Sci. 9:1621-1651 (2008) which describe delignification or lignocellulosic waste treatment processes including alkaline peroxide treatments.

In addition to pulping processes described above, pulp bleaching is often performed to produce bright white papers. Pulp bleaching may use chlorine or alternatives to chlorine, such as chlorine dioxide, oxygen, ozone and hydrogen peroxide. Sodium hypochlorite is frequently used as a disinfectant or a bleaching agent. These chemical reagents are used either after the delignification process or as a pretreatment prior to delignification. Oxygen in its various forms has been used in pulp treatments such as bleaching. Oxygen molecules are relatively unreactive and need free radicals or very electron-rich substrates such as deprotonated lignin phenolic groups which require that treatments with oxygen be carried out under very basic conditions (pH >12). The reactions involved are primarily single electron (radical) reactions. Oxygen opens rings and cleaves sidechains giving a complex mixture of small oxygenated molecules. Transition metal compounds, particularly those of iron, manganese and copper, which have multiple oxidation states, facilitate many radical reactions and impact oxygen delignification. While these radical reactions are largely responsible for delignification, they are detrimental to cellulose. Oxygen-based radicals, especially hydroxyl radicals, HO., can oxidize hydroxyl groups in the cellulose chains to ketones and under the strongly basic conditions used in oxygen delignification, these compounds undergo reverse aldol reactions leading to cleavage of cellulose chains. Using hydrogen peroxide to delignify chemical pulp requires more vigorous conditions than for brightening mechanical pulp such as high pH and high temperature. This chemistry is very similar to that involved in oxygen delignification, in terms of the radical species involved and the products produced. Metal ions, particularly manganese, catalyze the decomposition of hydrogen peroxide. Ozone is a very powerful oxidizing agent and a significant challenge in using it to bleach wood pulp is to get sufficient selectivity so that the desirable cellulose is not degraded. Ozone reacts with the carbon-carbon double bonds in lignin, including those within aromatic rings.

When cardboard or newspaper is manufactured, different additives are often added to the pulp blend to impart particular properties. These additives include bonding agents to improve strength, sizing agents to enhance water resistance, and fillers such as minerals or pigments to improve smoothness or optical properties. When cardboard or newspapers are recycled, the additives they contain usually are removed via pretreatment processes.

Unlike prior delignification or bleaching processes an objective of the invention is to free cellulose from lignin at low pH and at low temperature thus sparing it from degradation and destruction as well as providing a more convenient and economical process for purifying cellulose, especially from waste paper, cardboard or agricultural litter.

However, there is a need for a simpler process that uses less energy and milder and smaller quantities of chemical reagents to remove lignin from cellulose, especially from readily available recycled products like cardboard or newspaper. In view of the need for such a process the present disclosure describes a safer, more environmentally friendly and efficient way to separate cellulose and lignin from these materials.

SUMMARY OF THE INVENTION

The present invention is directed to an efficient, economical, and environmentally friendly process for the delignification of lignin-containing materials, such as cardboard, newspaper, and agricultural or tree pruning wastes, especially date palm waste, to produce cellulose using low temperatures and low concentrations of hydrogen peroxide. This process is accomplished using an apparatus containing a column fitted with a semipermeable gasket that pressurizes the column by retaining oxygen released by action of the hydrogen peroxide on a lignin-containing material. A very important factor for accomplishment of the delignification process is changing the oxidant reagent used ($H_2O_2$) at least two times throughout the delignification process. Accordingly, three masses of the oxidant can be used among the process.

In some embodiments each mass of the oxidant is able to dissolve about a third of the lignin content of the parent lignocellulosic precursor used. Unlike prior delignification processes, the process of the invention is simple, convenient and economical. It does not require high temperatures or high pH, concentrated extractants or caustic chemicals. In avoiding these extractants and chemicals as well as being adaptable to use of solar heating it also more environmentally friendly.

BRIEF DESCRIPTION OF THE FIGURES

FIG. 3. The multipurpose apparatus used for the hot water pretreatment, elimination of $CaCO_3$, and maceration of cellulosic fibers using $H_2O_2$.
FIG. 4A. Cardboard, crude sample, pretreated.
FIG. 4B. Cardboard macerated cellulosic agglomeration.
FIG. 4C. Cardboard, ground alpha cellulose.
FIG. 4D. Newspaper, crude sample, pretreated.
FIG. 4E. Newspaper, macerated cellulosic agglomeration.
FIG. 4F. Newspaper, ground alpha cellulose.
FIG. 7A. SEM micrograph of the recycled newspapers, crude sample.
FIG. 7B. SEM micrograph of the recycled newspaper macerated cellulosic fibers.
FIG. 8A. X-ray diffractogram of cellulosic fibers: as a bulk in crude cardboard.
FIG. 8B. X-ray diffractogram of cardboard cellulosic fibers after separation by maceration process.

DETAILED DESCRIPTION OF THE INVENTION

Figure 1:
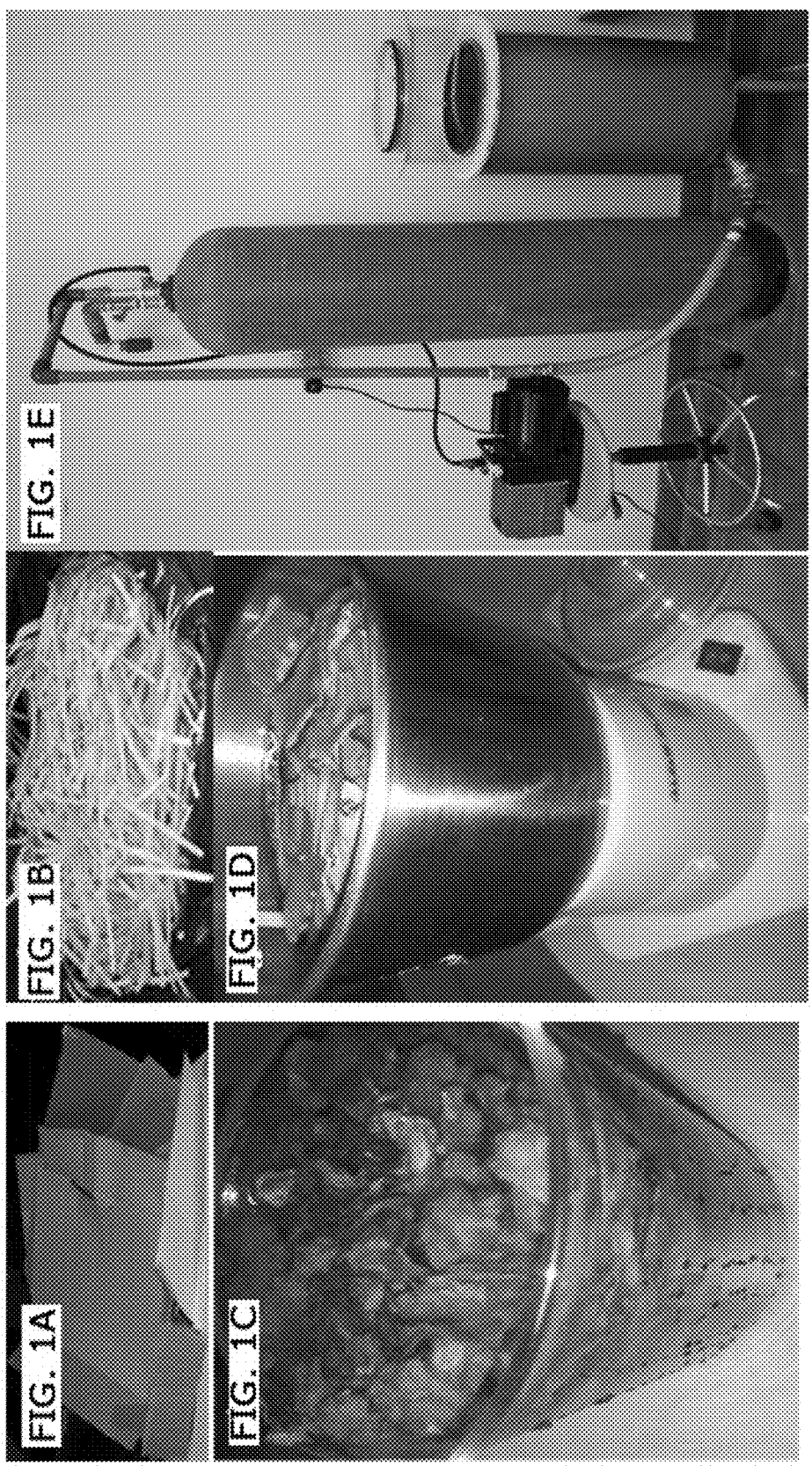
FIG. 1A. Photo of cardboards for recycling.
FIG. 1B. Photo of newspapers for recycling.
FIG. 1C. Illustrates water-softened raw materials.
FIG. 1D. Illustrates blending of the softened raw materials,
FIG. 1E. Depicts on example of a vacuum-filtration unit.

Many embodiments of the invention are directed to delignification method and to an apparatus that uses a semipermeable gasket at the top of a reaction column or reaction chamber. This gasket maintains the internal pressure within the reaction column at a certain level by partially preventing the escape of oxygen or other gases generated during a contacting step between a lignocellulosic material and hydrogen peroxide ($H_2O_2$). While not being bound to any particular technical explanation, the inventor believes that the semipermeable gasket increases the concentration of oxygen and oxygen radicals, thereby facilitating delignfication. The internal pressure relative to ambient atmospheric pressure may also at least in part be elevated by breakdown of the hydrogen peroxide or other chemical reactions occurring in the column. In some embodiments, metal ion catalysts that facilitate breakdown of hydrogen peroxide into oxygen and water may be employed. In other embodiments, free radical inhibitors may be added to modulate the rate at which lignin is extracted or to further protect cellulose from oxidation.

A semipermeable gasket is employed to prevent rupture, explosion, or damage to a reaction chamber or column or other parts of an apparatus treating the lignocellulosic material with hydrogen peroxide. The gasket is selected or designed to pass some oxygen atoms or molecules and retain others, thus maintaining the internal pressure and/or partial pressure of oxygen during contact of a lignocellulosic material with hydrogen peroxide at a substantially constant value, most preferably by maintaining the partial pressure of oxygen during the contacting step at a value higher than the partial pressure of oxygen in the atmosphere. The gasket also serves to keep the pressure below a limit where the reaction column or other apparatus components would be at risk of damage or failure. In some embodiments, the internal pressure in the column may reach about 40 psi (2.7 bar) and be higher than ambient atmospheric pressure due to increased partial oxygen pressure as well as water steam inside the column. In this embodiment, the porosity is adequate for penetration of some of the water steam to retain safe conditions within the column without substantial loss of oxygen radicals responsible for delignification. In other embodiments, the internal pressure may range from at least about >14.696 (atmospheric pressure), 15, 20, 30, 40, 50, 60 psi.

In some embodiments, the semipermeable gasket consists essentially of the upper flange, the lower flange, and the tightly compressed cotton container inserted between them. The tightly compresses cotton may be wetted with water prior to placement in the container. In this embodiment, two flanges are arranged below and above the container and fixed within a compression machine (Instron) whereby the cotton mass is affected by a compression stress equal 60 psi (4.1 bar). Before releasing the force, the two flanges are tightened together using screws to retain the compression degree within the cotton plug. In other embodiments, the compression stress may range from about 15, 20, 30, 40, 50, 60, 70, 80, 90 or 100 psi.

While not being limited to any particular explanation, at an elevated internal pressure, the concentration, and/or rate of formation of the oxidizing free radicals may be high enough to dissolve more lignin molecules from the ligno-cellulosic tissues enhancing the delignification efficiency at a low temperature and without degradation of cellulose as exemplified by the invention. However, if too many oxygen free radicals escape the reaction column or chamber, the delignification efficiency is reduced, diminishing the amount of lignin that dissolves in the reagent liquor and the yield of purified cellulose. Moreover, a too high number of oxygen free radicals may damage or degrade the cellulose.

Some non-limiting embodiments of the invention include the following: One embodiment of the invention is a method for delignification of a ligno-cellulosic material that includes blending a ligno-cellulosic material comprising cellulose and lignin with water to form an aqueous liquor, contacting the aqueous liquor with hydrogen peroxide under non-alkaline conditions, wherein oxygen generated during said contacting increases internal pressure relative to ambient atmospheric pressure, or increases partial internal $O_2$ pressure relative to ambient partial $O_2$ pressure during said contacting, removing dissolved lignin, and recovering cellulose. In this method the lignocellulosic material may be paper or cardboard. A lignocellulosic material includes biomass containing both lignin and cellulose such as plant dry matter. Plant biomass includes that from energy crops such as switch grass or Elephant grass, agricultural wastes, such as corn stover, sugarcane bagass, or straw, forestry wastes such as saw mill and paper mill discards, and municipal waste streams.

In this method the contacting may occur in the absence of NaOH or aqueous ammonia or other strong bases, in the absence of chlorine compounds such as chlorine dioxide, and/or in the absence of methanol, hydrochloric acid and/or sulfur dioxide.

In some embodiments of this method it further includes contacting the ligno-cellulosic material with hydrochloric acid or another acid to remove calcium carbonate or other non-cellulose materials prior to contacting the aqueous liquor with hydrogen peroxide. Such materials to be removed include inks, pigments, dyes and substances which can interfere with the crystallization of alpha cellulose.

In other embodiments of the above methods, the aqueous liquor contains no more than about 1, 2, 3, 4, 5, 6, 7, 8, 9, or 10 wt % hydrogen peroxide at a liquid to solid ratio of 10:1 to 20:1. In some embodiments, the aqueous liquor is contacted with about 1-3 wt % hydrogen peroxide at a liquid to solid ratio of 10:1 to 20:1. In some embodiments, the aqueous liquor is contacted with no more than about 0.5, 1, 2, 3, 4, 5, 6, 7, 8, 9, 10, 15, 20, 25, 30, <35 or 35 wt % hydrogen peroxide at a liquid to solid ratio ranging from 1:1 to 100:1, more preferably at a liquid to solid ratio of 5:1 to 50:1, and advantageously at a liquid to solid ratio of 10:1 to 20:1. These ranges include all intermediate subranges and values.

In other embodiments of the above methods, the pressure at which said contacting occurs is at least 1, 2, 3, 4, 5, 6, 7, 8, 9, 10, 20, 50, 100, 200 or 500% above ambient atmospheric pressure, e.g., by the release of oxygen during the contacting step. In some embodiments, the partial oxygen pressure during contacting may be increased relative to partial atmospheric oxygen pressure, for example, by at least 0.5, 1, 5, 10, 15, 20, 25, 30, 35, 40, 45, 50, 100, 200 or 500%. In some embodiments, the contacting may occur at ambient atmospheric pressure but at a higher than ambient atmospheric partial oxygen pressure.

In other embodiments of the above methods, the contacting occurs at a temperature ranging from about 0 to 100° C., such as 0, >0, 5, 10, 20, 30, 40, 50, 60, 70, 80, 90, <100, or 100° C., for example, the contacting can occur at a temperature ranging from about 60 to 80° C.

In some embodiments of the above methods, contacting occurs in a column that is closed to atmospheric pressure by a semipermeable gasket and that retains sufficient oxygen or oxygen radicals in the column to maintain a higher than atmospheric pressure in the column.

The methods described herein may be performed with an apparatus comprising a semi-permeable gasket fixed to a top of a reaction column that prevents escape of sufficient oxygen molecules produced by said hydrogen peroxide treatment to enhance efficiency of delignification compared to an otherwise identical apparatus that does not comprise the semipermeable gasket. The methods described herein may further include repeating the contacting, removing and/or recovering steps at least once, twice, three times or more, wherein repeating comprises replacing a part of the aqueous liquor containing dissolved lignin with a fresh solution of hydrogen peroxide. The fresh solution may comprise a unit quantify of diluted or undiluted hydrogen peroxide, an aqueous extraction buffer, or other ingredients suitable for removal of lignin from a lignocellulosic material.

Another embodiment of the invention is an apparatus or system that includes a pressurized reaction column, a ligno-cellulosic material and hydrogen peroxide contained in the reaction column, and a semi-permeable gasket fixed to the top of the pressurized reaction column that retains oxygen produced by hydrogen peroxide treatment of a lignocellulosic material and maintains above atmospheric pressure in the reaction column. In some embodiments the apparatus or system will include a grinder or macerator.

In some embodiments the apparatus or system will contain a semi-permeable gasket containing cotton or another woven or non-woven natural, blend or synthetic fiber, for example, the semi-permeable gasket may contain a cotton membrane that is semi-permeable to oxygen. In further embodiments of this apparatus or system, it may further include a filter and/or receptacle for removing and/or retaining lignin and other non-cellulose waste products; and/or may further include one or more reservoirs for water, HCl or other acid, or hydrogen peroxide, heaters, condensers, lines, valves, pumps, filters, meters, controllers, drains, and/or waste receptacles.

The method and apparatus of the invention provide a number of benefits absent from prior art methods. A complex reaction chamber is not required because the basic steps of the method of the invention substantially can be performed in a single column or reaction chamber. The delignification liquor containing lignin, which is usually dark or black, can be excluded completely by vacuum-filtration once dissolved in a delignification regent (or aqueous liquor or extraction buffer) and substituted by delignification reagent containing fresh hydrogen peroxide for a subsequent extraction step. Each fresh amount of delignification reagent is able to delignify an additional amount of the crude material. With the frequent withdrawing of dark or black liquor containing lignin or lignin byproducts and substitution by newly fresh reagent, all the lignin can be excluded leaving substantially pure cellulose.

The invention does not discharge toxic chlorine or other harsh chemical by products because the liquid chemical waste of the $H_2O_2$ used in the method of the invention is just water. Thus, in one embodiment the invention is more environmentally friendly than conventional processes that use harsh extractants to remove lignin.

The method of the invention reduces wastes that are often emitted into the environment through use of a withdraw pump that takes some of $H_2O_2$-liquor continuously from the reaction column across a filter, such as a Whatman no. 44-based filter or equivalent, and returns it to the same column through a closed cycle. This reduces or eliminates the lignin and other chemical waste content in drainage and minimizes environmental impact.

The overall wastes produced by the method of the invention comprise water, sugars, and lignin that can be subjected to further recycling processes to get additional products, especially ethanol production. Moreover, an apparatus performing the method of the invention may be configured to capture or remove accumulated chemical wastes using filter that retains lignan, such as a Whatman paper no. 44-based filter, and discharge substantially clean, solid-free water to municipal drainage. This type of filter paper has very fine pores smaller than the dimensions of lignin molecules. Accordingly, lignin can be collected from solution by passing the solution through filters containing Whatman filter papers #44. However, other functionally equivalent filters may be fabricated using other cellulosic resources that have a similar permeability as Whatman filter paper #44. A filter paper or other filter or filtration device having a pore size in the range of 0.4, 0.5, 1, 1.5, 2, 2.5, 3, ≥4 μm may be selected to remove lignans. Different grades of filter paper may be selected depending on the size of the lignan molecules to be removed, for example, Grade 602h filter paper has a pore size of 2 μm and in a preferred embodiment Whatman filter paper #44 type filter paper (or its equivalent), which has a pore size of 3 μm, may be used.

Other modes of filtration may also be employed to separate ligand prior to disposal of wastes. Gooch crucibles and fritted glass filters may also be used to remove lignan, for example, a Gooch crucible may be fitted with a fritted glass filter having a fine pore size in the range of 0.4, 0.5, 1.0, 1.5, 2, 2.5, 3, and ≥3 μm and used to remove lignans. Other modes of filtration are known and may be adapted to remove lignan. These include filtration methods using surface filters which trap lignans. Devices such as a Büchner funnel, vacuum filter, rotary vacuum-drum filter, belt filter, or a cross-flow filter, or screen filters, may be adapted to remove lignans. Centrifugation, dialysis, lyophilization or further chemical treatments may be performed in some embodiments but are not required. In some embodiments, a filter is selected that removes 10, 20, 30, 40, 50, 60, 70, 80, 90, 95, 99 or 100 wt % of the lignin.

The invention is more economical than many conventional processes. Hydrogen peroxide is inexpensive compared to reagents used in other processes for isolating cellulose or removing lignin, preferably hydrogen peroxide is the only reactive feedstock other than HCl used in the process. Moreover, the method of the invention can use hydrogen peroxide at a low concentration, such as 2 wt %, preferably 1 wt % or 0.5 wt %, although higher concentrations such as 5 wt % and 10 wt % may be used, instead of at a higher concentration such as 35% used by other processes without impairing lignin extraction efficiency.

The method of the invention saves energy because contact between the lignocellulosic material and hydrogen peroxide can be performed at a lower temperature such as at a temperature of about 20, 30, 40, 50, 60, 70, 80, 90 or 100° C., preferably at or below 70° C. unlike many prior art processes requiring high energy input such as processes that require temperatures reaching up to 170° C. Moreover, the lower temperatures required by the method of the invention can more easily be provided by trapping solar energy obtained using solar collectors, including those using transparent hardware such as acrylic plastic or flat plates solar collectors. Further energy savings may be realized by using a forced air drying system using solar energy or heat.

The investment costs of practicing the invention on an industrial scale are lower due to an uncomplicated pathway for storing, handling and dispensing the main reagent, hydrogen peroxide. This is attributable in part to the simplicity of using hydrogen peroxide to extract lignin instead of other harsher chemicals requiring a higher investment in containment and safety features. Moreover, pipes, tanks, pumps, solenoids and other accessories used for handling the $H_2O_2$ are commercially available.

A process of the invention may comprise one or more of the following steps. Lignocellulosic material is pretreated to soften and blend it into a mass that can easily be contacted with dilute hydrogen peroxide. Newspaper, cardboard, or agricultural materials, which may be may optionally be pretorn, preground or otherwise reduced in size, are softened in water or an aqueous buffer. In some embodiments, scraps of lignocellulosic material are softened in cold water at or below 25° C. and then over-saturated with hot water above 25, 30, 35, 40, 45, 50, 60, 65, 70, 75, 80, 85, 90, 95, <100 or 100° C. to form a viscous gelatinous liquor as shown for example if FIG. 1D.

The softened scraps or viscous gelatinous liquor prepared from them may be further washed in water or other extractants to remove soluble materials, such as additives incorporated into paper or cardboard including soluble polymers, blenders, inks, pigments, and dyes. After such extraction the solid materials may be recovered by centrifugation, or preferably by vacuum filtration. This washing and recovery step may be performed more than once. In cases where production of a final pure alpha cellulose for production of microcrystalline ("MCCs") or nanocrystalline cellulose ("NCCs") is desired, the air-dried cardboards or newspapers can be treated with HCl or another acid to dissolve $CaCO_3$ that was added during manufacturing. Conventional treatments to remove inks, or dyes, or pigments may also be performed. The samples may then be vacuum-filtered and washed adequately to remove any traces of the $CaCO_3$ to prevent its interference with the final crystals of MCCs and NCCs. On the other hand, when the alpha cellulose is desired for paper making, it is not necessary to exclude all the $CaCO_3$ content due to its role for improving paper quality.

The resulting recovered materials after extraction may be optionally dried, preferably by solar heat or power, for example, using a solar-air-forced circulation mini-greenhouse drier for at 25, 30, 35, 40, 45, 50, 55, 60, 65, 70, 75, 80, 85, 90, 95,<100 or 100° C.

After recovery and/or drying, the recovered materials may be converted into cellulosic micrometric hairs, for example, by grinding.

In the present invention, $H_2O_2$ is used as a delignification reagent to separate cellulosic fibers from each other by dissolving lignin found between fibers as well as that incorporated within their cell walls unlike prior processes where hydrogen peroxide has been used as a bleach reagent solely or in a synergistic mixture with other bleachers either in pretreatment or in final steps of pulping process, but not as a lignin extractant. In the invention hydrogen peroxide is diluted from a commercial concentration to a low concentration, for example, from 35 wt % down to 2 wt %, to reduce delignification cost without weakening the fiber maceration efficiency. The ratio of the delignification liquor containing the diluted hydrogen peroxide to the lignocellulosic material is 1:1 to 50:1, preferably 5:1 to 25:1, more preferably about 15:1. It is possible by the method presented in this invention to obtain cellulose from a lignocellulosic material irrespective or origin and pretreatment. It is also possible to undertake a controlled pretreatment of the lignocellulosic material used in order, for example, to modify the solubility in organic or inorganic solvent. It is also possible to use an already partly decomposed lignocellulosic material. It is also possible to use lignin- and cellulose-containing biomass, for example wood, without preceding removal of the lignin content of the biomass.

Figure 2:
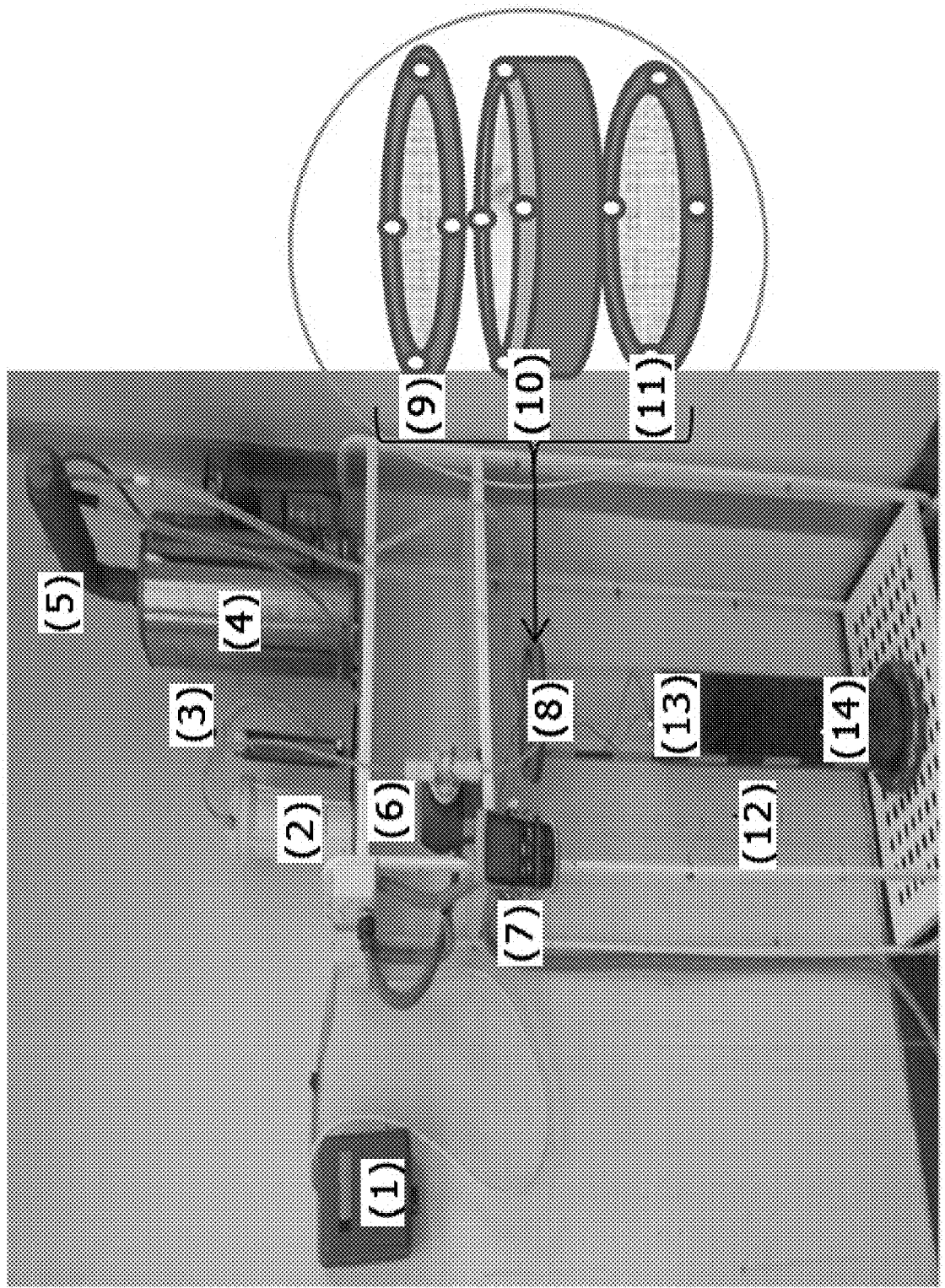
FIG. 2. One embodiment of a multipurpose apparatus for treating cardboards or newspapers:
(1) electric source and controller,
(2) Whatman tissue no. 44-based filter,
(3) water flowmeter,
(4) water-heater,
(5) condenser,
(6) withdraw pump,
(7) thermocouple thermometer,
(8) a semipermeable gasket: (9) the upper flange, (10) the tightly compressed cotton container, and (11) the lower flange, and
(12) a reaction column: (13) the lignocellulosic materials, and (14) the $H_2O_2$-liquor.

One embodiment envisages removing lignin from a lignocellulosic material in a suitable reactor such as that shown as part of FIG. 2. Other embodiments of this apparatus or system may contain functionally equivalent elements of the elements described in FIG. 2. These equivalents include various kinds of filter papers or materials, electrical, gas, solar or geothermal heaters, different controllers, flow meters, thermocouple thermometers, pump, alternative semipermeable gaskets that retain oxygen, plastic, glass, ceramic, or metal (e.g., stainless steel) reaction columns, various kinds or concentrations of $H_2O_2$ liquors, or other lignin-containing materials. For example, a semipermeable gasket may contain other woven or non-woven materials besides compressed cotton, such as paper or other natural fiber, nylon or other synthetic fiber, or fiberglass or other mineral fibers. It may also contain a membrane that is semipermeable to oxygen such as a gas exchanging membrane, see Montoya, https://permselect.com/files/Using_Membranes_for_Gas_Exchange.pdf (incorporated by reference, last accessed Nov. 16, 2017). Other types of membranes may also be used to separate or enrich concentrations of gases such as oxygen; see Kerry, Frank (2007). Industrial Gas Handbook: Gas Separation and Purification. CRC Press. pp. 275-280 (incorporated by reference). These include membranes comprising polyamide, cellulose acetate, or ceramic materials.

A lignocellulosic material is dissolved, suspended or incorporated in a suitable liquid medium containing dilute hydrogen peroxide, preferably a non-alkaline medium without reactive chlorine, or reducing agents such as methanol, hydrochloric acid, or sulfur dioxide. The medium may also contain substantially no added alkali, such as NaOH, KOH, or ammonia, substantially no added acids, and no added metals. However, in some embodiments metal catalysts that promote or inhibit the breakdown of hydrogen peroxide or free radicals may be present.

The mixture is brought for a sufficiently long time to conditions which facilitate degradation and/or extraction of lignin, especially under mild nonalkaline conditions at a temperature less than 100, 90, 80, 70, 60, 50, 40, 30 or 20° C.

The temperature may range from a temperature at which the medium containing the lignocellulosic material is liquid, such as between 0° C. and 150° C., preferably between 25° C. and 100° C., more preferably not more than 30, 40, 50, 60, 70 or 80° C. (or any intermediate value within these ranges). A lower extraction temperature, such as one produced by solar heating, is economically preferred.

Lignin can be degraded here in the presence of hydrogen peroxide under inert gas, oxygen-containing, ozone-containing, or hydrogen-containing gas, at pressures up to >1, 2, 5, 10, 20, 50, or 100 bar. Preferably from the standpoint of convenience and economy, the pressure is elevated by chemical reactions occurring in the reaction vessel and not by external means.

The pH may be, or be set, within the range of 0, 1, 2, 3, 4, 5, 6, 7, 8, 9, or 10. Preferably, a delignification process according to the invention is performed under non-alkaline conditions, for example, between pH 1, 2, 3, 4, 5, 6 and 7, preferably between 5 and 7, and without substantial elevation of the pH, for example, in a liquid essentially consisting of water, hydrogen peroxide, and a lignocellulosic material or without components that elevate the pH value by more than about 0.1, 0.25, 0.5, 1.0, 1.5, or 2.0 (or any intermediate value within this range) units beyond that of a mixture of water, hydrogen peroxide and a lignocellulosic material. The degradation of the lignocellulosic material by exposure to hydrogen peroxide under such conditions facilitates removal lignin from the lignocellulosic material and darkening or blackening of the liquor containing the lignin or oxidized lignin removed from the lignocellulosic material.

Unlike prior methods in which a single stage delignification or bleaching step is performed, the invention conveniently permits multiple extractions of the lignocellulosic material with dilute hydrogen peroxide, for example, in three repeated stages with the same reaction column. This multiple stage extraction in combination with the mild extraction conditions with dilute hydrogen peroxide at a relatively low temperature compared to harsh high-temperature, high pH processes, provides a significantly higher purity and higher quality, less degraded cellulosic product.

Cellulose from which part or substantially all lignin has been extracted may be recovered by filtration.

Waste materials, including spent extraction medium or liquor containing oxidized or extracted lignin may be directed to waste receptacles.

Example

Preparation of the Lignocellulosic Materials

Collection. The cardboards (FIG. 1A) and newspapers (FIG. 1B) were collected by the Scientific Endowment of King Abdullaziz University (KAU) at three different collection times (replicates). From each of the three replicates, three samples were taken randomly. Accordingly, nine samples were collected to represent each of the recycled newspapers and cardboards. The 18 samples of the collected samples (cardboards and newspapers) were sorted and converted into scraps.

Pretreatment Processes. The scraps were softened in cold distilled water and over-saturated by hot distilled water (FIG. 1C). The sample was blended to obtain viscous gelatinous liquor (FIG. 1D). Fibers were vacuum-filtered and washed (FIG. 1E) to remove any additives added while manufacturing, such as soluble polymers, blenders, and dyes. The resulting cellulosic samples were solar-dried using a solar-air-forced circulation mini-greenhouse drier for 24 hr at 70° C. Using a suitable grinder, approximately 100 g of an air-dried sample from each replicate was converted into cellulosic micrometric hairs. In the case of using the final pure alpha cellulose for production of microcrystalline ("MCCs") or nanocrystalline cellulose ("NCCs"), the air-dried cardboards or newspapers were treated with HCl (0.1N) to dissolve $CaCO_3$ that was added during manufacturing. The samples were vacuum-filtered and washed adequately to remove any traces of the $CaCO_3$ to prevent its interference with the final crystals of MCCs and NCCs. On the other hand, when the alpha cellulose is desired for paper making, it is not necessary to exclude all the $CaCO_3$ content due to its role for improving paper quality.

Diluted hydrogen peroxide ($H_2O_2$) has been used as a bleach reagent solely or in a synergistic mixture with other bleachers either in pretreatment or in final steps of pulping process, but not as a lignin extractant. In contrast, in the present invention, dilute $H_2O_2$ was used as a unique delignification reagent to separate cellulosic fibers from each other by dissolving lignin found between fibers as well as that incorporated within their cell walls. The hydrogen peroxide was diluted from a commercial concentration of 35 wt % down to 2 wt %. This dilution was found to significantly reduce delignification cost without weakening the fiber maceration efficiency.

The pretreated lignocellulosic material was mixed at a ratio of 15:1 wt/wt with the dilute hydrogen peroxide delignification liquor.

The maceration and delignification of the crude cardboards and newspapers was performed using the multipurpose apparatus presented at FIG. 2 which contains the following parts:electric source and controller (1),Whatman tissue no. 44-based filter (2),a water flowmeter (3). water-heater (4),a condenser of the heater (5),a withdraw pump (6),a thermocouple thermometer (7),a semipermeable gasket (8) which contains an upper flange of semipermeable gasket (9), a tightly compressed cotton container (10) and a lower flange (11), a reaction column (12) that contains $H_2O_2$-liquor (13) and recycled cardboards or newspapers (14).

A feature of the apparatus is the use of a semi-permeable gasket FIG. 2 (8) fixed to the upper flange of the reaction column. This gasket maintains the internal pressure and other conditions within the reaction column at a level that accelerates or facilitates the extraction of lignin, but that does not damage or otherwise impair the apparatus or its components by blocking or impairing emission of oxygen generated by contact between hydrogen peroxide and a lignin-containing material. At a suitable internal pressure, the concentration of the oxidizing free radicals (e.g., $O^-$) is high enough to dissolve more lignin molecules from the lignocellulosic tissues enhancing the delignification efficiency. However, if too many oxygen free radicals are removed from the reaction column, the delignification efficiency is reduced so that little lignin content can be dissolved in the reagent liquor and subsequently excluded from the lignocellulosic material being processed. The term "increased pressure" refers to the pressure inside of a reaction vessel or column, which is exerted on the gas, liquid or solid components therein, in which a contacting step is performed between hydrogen peroxide and a liquor containing a lignocellulosic material. In some embodiments the increase pressure will refer to the total internal pressure in the reaction vessel or column, in other embodiments it will refer to the relative increase in O2 pressure with respect to ambient atmospheric partial O2 pressure. In some embodiments, the increased pressure will be 10, 20, 50, 100, 200, 300, 400, or 500% (or any intermediate value within this range) that of ambient atmospheric pressure or that or ambient atmospheric partial oxygen pressure. In other embodiments, increased pressure is manifested by an increase in the concentration of oxygen atoms, free radicals, ozone, or oxygen molecules in or around solid or liquid components in the reaction vessel or column compared to the same components which have not been contacted with hydrogen peroxide, for example, by 10, 20, 50, 100, 200, 300, 400, or 500% (or any intermediate value within this range).

In one embodiment, a multipurpose apparatus or a system for separating cellulose and lignin performs the following six tasks:
 a. cold water-pretreatment.
 b. hot water-pretreatment.
 c. charging distilled water into the reaction column.
 d. delignification and maceration of cellulosic fibers.
 e. elimination of calcium carbonate.

TABLE 1

Operational states[1] of solenoid valves (V) in one embodiment of a multipurpose apparatus that performs CWP, HWP, CDW, ECC, DHP, and PBL.

| Task[3] | $V_1$ | $V_2$ | $V_3$ | $V_4$ | $V_5$ | $V_6$ | $V_7$ | $V_8$ | $V_9$ | $V_{10}$ | $V_{11}$ | $V_{12}$ | Water Heater[2] |
|---|---|---|---|---|---|---|---|---|---|---|---|---|---|
| CWP | C | C | C | C | C | C | O | C | O | O | C | O | Off |
| HWP | C | C | C | C | C | C | O | C | O | O | C | O | On |
| CDW | O | C | O | C | O | O | C | O | C | C | C | C | Off |
| ECC | O | C | O | O | C | C | C | O | C | C | C | C | Off |
| DHP | O | O | C | C | C | C | C | O | C | C | C | C | Off |
| PBL | C | C | C | C | C | C | O | C | C | O | O | C | Off |

[1]'O' refers to that valve is open, while 'C' refers to its closed state.
[2]'On' refers to that the heater is set on, while 'off' refers to its set off.
[3]CWP is the cold water pretreatment, HWP is the hot water pretreatment, CDW is the charging distilled water into the reaction column, ECC is the elimination of calcium carbonate from cardboards and newspapers, DHP is the delignification by hydrogen peroxide, and PBL is the purification of black liquor.

The Maceration Process. The maceration process that is a result of the delignification action was performed at a temperature of 70° C., whereby it can be obtained either by electric heating coils or by flat plate solar collectors. One feature of this embodiment of the invention is the using of three subsequent individual steps of the delignification process within the same reaction column reducing the actual reaction volume. The delignification liquor ($H_2O_2$) is excluded completely by vacuum-filtration at the end of a certain step, and substituted by the same amount and concentration of the same delignification reagent for the next step. Accordingly, each fresh $H_2O_2$-fraction is able to delignify a part of the crude material. With the frequent withdrawing the black liquor and substitution by fresh reagent, all the lignin could be excluded. As shown in FIG. 4, there are three products as a result of recycling cardboards (FIG. 4A) and newspapers (FIG. 4B), namely pretreated crude sample, macerated cellulosic fibers, and ground alpha cellulose.

Analysis of Fibers

Fiber length and fiber width determination by Optical Microscopy. An optical system consisted of a light microscope (CE-MC200A) in different magnification powers with suitable vision system (OPTIKA PRO 5 Digital Camera-4083.12, OPTIKA, Italy) with a Vision PRO 4 software was used to examine the macerated fibers (Hindi, 2017[b,c]). A drop of macerated sample was mounted onto a slide and the fiber length and width were measured after staining with 1% aqueous safranine. About twenty fibers were measured from each of the three slides prepared to represent each of cardboards and newspapers). Since nine samples were collected to represent each of the recycled newspapers and cardboards (3 replicates×3 samples×20 observations), accordingly 180 fibers were measured among the investigation (Hindi, S. S. Z., Bakhashwain, A. A. and El-Feel. A. A. 2011. *Physico-chemical characterization of some Saudi lignocellulosic natural resources and their suitability for fiber production*. JKAU; Met. Env. Arid Land Agric. Sci. 21(2): 45-55.; Hindi, S. S. Z. 2017. *Some promising hardwoods for cellulose production: I. Chemical and anatomical features*. Nanoscience and Nanotechnology Research, 4 (3): 86-97. doi: 10.12691/nnr-4-3-2.). Hindi, S. S. Z. 2017[a]. *Suitability of date palm leaflets for sulphated cellulose nanocrystals synthesis*. Nanoscience and Nanotechnology Research, 4 (1): 7-16. DOI:10.12691/nnr-4-1-2.

Figures 5A, 5B:
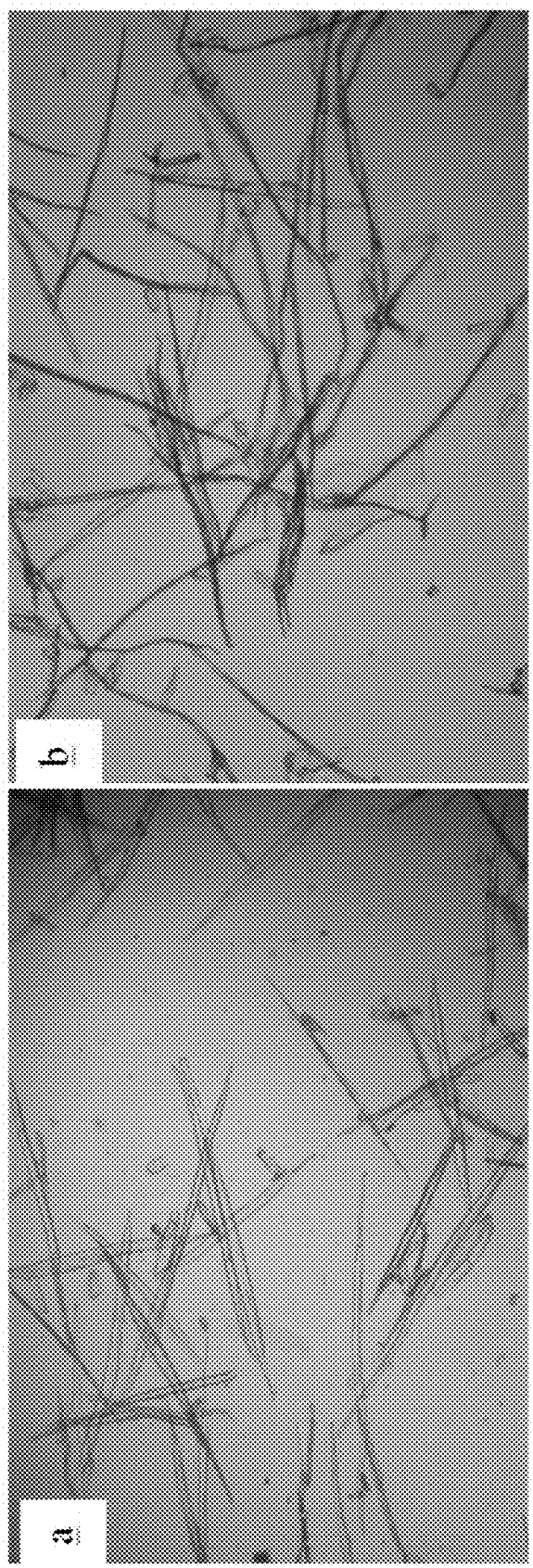
FIG. 5A Optical image of cellulosic fiber cells macerated from cardboard.
FIG. 5B Optical image of cellulosic fiber cells macerated from newspapers.

Fiber dimensions of the crude and macerated materials from each of cardboards and newspapers were studied by optical microscopy. It was found that these fibers had lengths ranged from 0.821 to 1.473, whereas their width is ranged from 24.96 to 33.2 μm. These values are in the ordinary ranges of softwoods and hardwoods. In addition, there no significant differences between the macerated cellulosic fibers and their parent crude materials were identified indicating that using $H_2O_2$ did not reduce or fracture the fibers. In addition, studying the morphological structure of the cellulosic fibers macerated from cardboards and newspapers confirmed the same finding (Table 2 and FIG. 5).

TABLE 2

Fiber length and fiber width of four cellulosic materials.

| Cellulosic materials | Fiber length mm | Fiber width μm |
|---|---|---|
| Crude cardboards after pretreatment | 0.822 (0.184) | 24.97 (1.563) |
| Cardboards-based cellulosic fibers after maceration | 0.821 (0.193) | 24.96 (1.544) |
| Crude newspapers after pretreatment | 1.468 (0.204) | 33.15 (1.783) |
| Newspapers-based cellulosic fibers after maceration | 1.473 (0.311) | 33.2 (1.788) |

[1]Each value is an average of 180 observations.
[2]The values between brackets are standard deviations.

Cardboards and newspapers are manufactured from wood fibers, either from hardwoods (deciduous/angiosperms) or softwoods (conifers/gymnosperms). Softwoods commonly have longer fiber length (3 to 5 mm) than that for hardwoods (1 to 2 mm). For the fiber width, softwood produces wider fibers (30 to 40 μm) than those for hardwoods (10 to 20 μm), as reported by Rothbard, D. R., 2001. *Electron Microscopy for the Pulp and Paper Industry*, Technical Paper Series Number 911, Institute of Paper Science and Technology (IPST), Atlanta, Ga.

Internal Structure of samples by Scanning Electron Microscopy (SEM). The lignocellulosic sample was mounted on a double side carbon tape on Aluminium stub and air-dried. Before examination, all samples were vacuum-sputtered with gold up to a thickness of about 15 nm (JEOL JFC-1600 Auto Fine Coater). The samples were investigated using SEM Quanta FEG 450, FEI, Amsterdam, Netherlands. The microscope was operated at an accelerating voltage ranged from 5-20 kV (Hindi, S. S. Z., and Abohassan, R. A. 2016. *Cellulosic microfibril and its embedding matrix within plant cell wall*. International Journal of Innovative Research in Science, Engineering and Technology 5 (3): 2727-2734). For each of cardboards and newspapers, three types of samples were investigated using the SEM, namely crude samples, after cold and hot water treatment, and after maceration by $H_2O_2$.

Figure 6A:
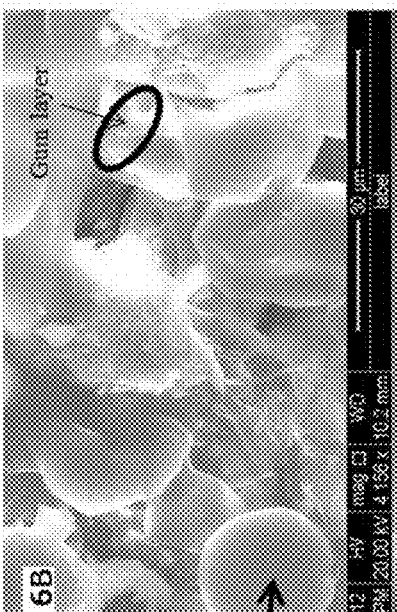
FIG. 6A. SEM micrographs of cardboards, crude sample showing the gum spheres.
Figure 6B:
FIG. 6B. SEM micrograph of cardboard, crude sample showing the gum spheres.
Figure 6C:
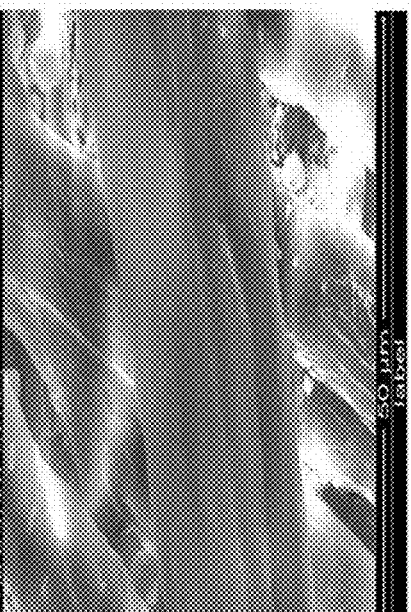
FIG. 6C. SEM micrographs of cardboard after cold and hot water treatment.
Figure 6D:
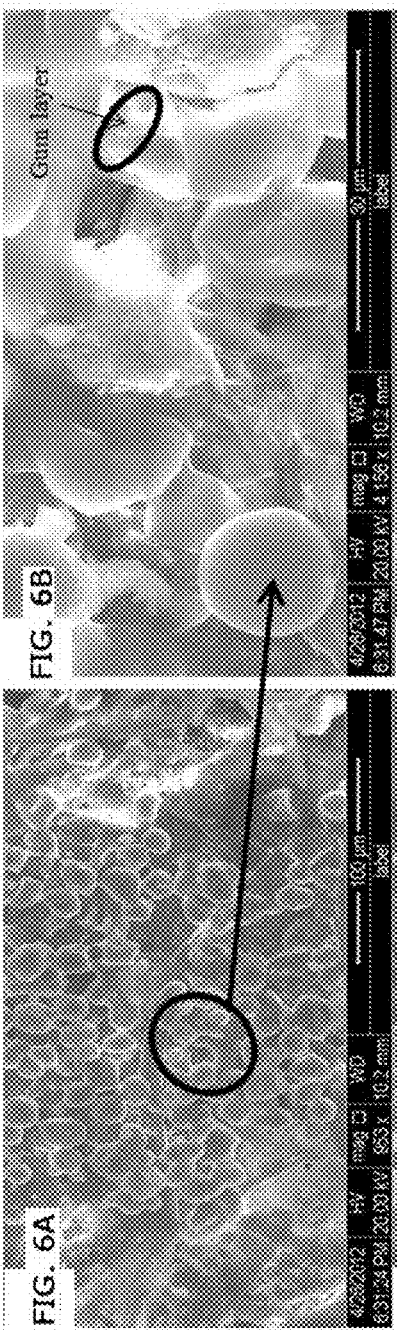
FIG. 6D. SEM micrographs of cardboard after cold and hot water treatment.
Figure 6E:
FIG. 6E. SEM micrographs of cardboards; macerated cellulosic fibers.

Studying the internal structure of the crude cardboards and their cellulosic fibers were done using the SEM tool. Gum spheres with a mean diameter of 13.7 μm can be seen from FIGS. 6A and 6B and are concentrated onto the cardboard surface and between its fibers and layers. Furthermore, when the number of gum spheres in a certain area is high, it was combined together constituting a single or multilayers (FIG. 6B). The SEM micrographs presented at FIGS. 6C and 6D indicated that cold and hot water assist the gum spheres as well as gum layers to be disappeared indicating the efficiency of the pretreatment processes. In addition, the cardboards-based cellulosic fibers were intact and are completely separated from each other referring to the high efficiency of the current invention. Comparing the SEM images of the crude newspapers (FIG. 7A) and the pure cellulosic fibers macerated using current $H_2O_2$-maceration invention (FIG. 78), revealed that this method allowed the newspapers-based fibrous bulks to be completely separated without distortion.

X-ray Diffraction (XRD) Analysis of Samples. The wide angle XRD spectra of the crude samples (cardboards and newspapers) and their macerated cellulosic fibers were investigated by XRD 7000 Shimadzu diffractometer, Japan. The device system having a rotatable anode generator with a copper target and wide angle powder goniometer was used. The XRD-system was operated at 30 kV and 30 mA using CuKα radiation which is composed of K$α_1$ (0.15406 nm) and K$α_2$ (0.15444 nm). The resulting radiation was filtered out from the data using a single-channel analyser. Each of the divergence and scatter slits was 1° and the receiving slit was 0.15 mm at the same radius. Dried cellulosic samples (approximately 0.5 g) were mounted onto a quartz substrate using amorphous glue and scanned in 2θ ranged from 10° to 100°. All the samples were tested in the reflection mode with a scan speed of 4°/min in 0.05° steps (Hindi, 2017$^c$).

Figure 9A:
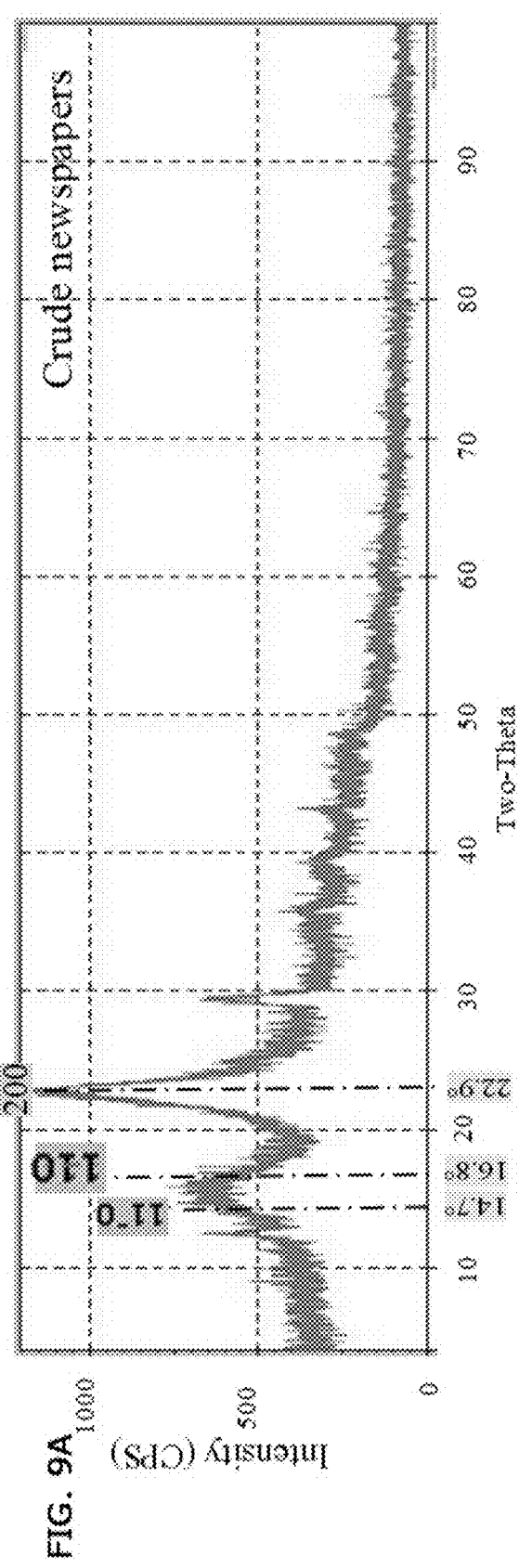
FIG. 9A. X-ray diffractogram of cellulosic fibers as a bulk in crude newspaper.

Featured Peaks. For the crude cardboards (Table 3 and FIG. 8A), the XRD-diffractogram of the crude cardboards exhibited a principle sharp peak around 2θ=22.6° for the 200-reflection related to hemicelluloses and alpha-cellulose. In addition, it has two adjacent broad peaks at 2θ=15.2° and 2θ=16.9° for the 11$\overline{\phantom{0}}$0 and 110 planes, respectively. Accordingly, there is a similarity between the resultant X-ray diffractogram of the crude cardboards and that for cellulose-I (FIG. 9A), especially regarding to the three crystallographic planes, namely 11$\overline{\phantom{0}}$0, 110 and 200.

For the cellulosic fibers macerated from cardboards (Table 3 and FIG. 8B), the cardboards-based cellulosic fibers showed one principle sharp peak around 2θ=23.1° representing the 200-crystallographic plane that belongs to hemicelluloses and alpha-cellulose. Furthermore, this diffractogram has two broad peaks at 2θ=15.3° and 2θ=17.5° related to the 11$\overline{\phantom{0}}$0 and 110 reflections, respectively. Accordingly, the similarity between the resultant cardboards-based cellulosic fibers and that for cellulose-I is clear (FIG. 8b), especially when regarding the crystallographic planes, namely 11$\overline{\phantom{0}}$0, 110 and 200.

Figure 9B:
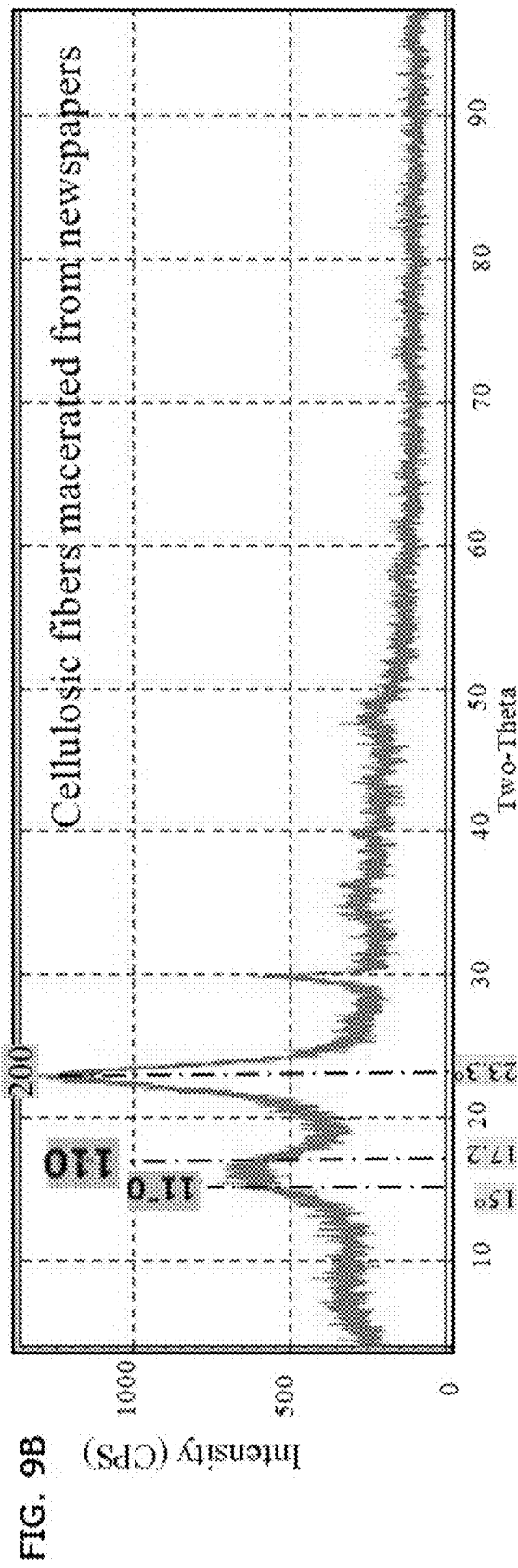
FIG. 9B. X-ray diffractogram of newspaper cellulosic fibers after separation by maceration process.

For the newspapers (Table 3 and FIGS. 9A and 9B), the double diffractograms of the crude and the macerated fibers showed a principle sharp peak around 2θ=22.9° and 23.3°, respectively representing the 200 reflection related to hemicelluloses and alpha-cellulose. In addition, the newspapers diffractograms showed two broad peaks at 2θ=14.7 and 2θ=16.8° (for the crude sample, FIG. 9A) and at 2θ=15° and 2θ=17.2° (for the macerated fibers, FIG. 9B representing 11$\overline{\phantom{0}}$0 and 110 reflections, respectively (Table 3). Accordingly, the XRD-diffractograms of the crude and macerated fibers of the newspapers is similar to that for cellulose-I for 11$\overline{\phantom{0}}$0, 110, and 200 planes.

TABLE 3

Two-theta$^{1,2}$ (degrees) determined from the XRD-differactograms for crude and macerated cellulosic fibers from each of recycled cardboards and newspapers.

| | | Crystallographic planes | | |
|---|---|---|---|---|
| | | 200 | 11$\overline{\phantom{0}}$0 | 110 |
| | Raw material | | 2θ° | |
| Crude | Cardboards | 22.6$^b$ | 15.2$^a$ | 16.9$^b$ |
| | Newspapers | 22.9$^b$ | 14.7$^b$ | 16.8$^b$ |
| Macerated Cellulosic Fibers | Cardboards | 23.1$^a$ | 15.3$^a$ | 17.5$^a$ |
| | Newspapers | 23.3$^a$ | 15$^{ab}$ | 17.2$^{ab}$ |

$^1$Each value is an average of 9 observations.
$^2$Means sharing the same letters within the same column are non- significantly different at 0.05 level of probability.

The diffractograms resulted from the XRD of the four cellulosic materials, namely crude samples of cardboards and newspapers, and macerated cellulosic fibers from cardboards and newspapers have the same trend whereby having three peaks at the same crystallographic reflections, namely 200, 11$\overline{\phantom{0}}$0 and 110 as follow:

(1) One principle sharp peak around 2θ ranged from 22.6° to 23.3° related to the 200 reflection that belongs to hemicelluloses and alpha-cellulose.

(2) Two broad peaks at 2θ ranged from:
I. 14.7° to 15.3° (for the 11$\overline{\phantom{0}}$0 plane).
II. 16.8° to 17.5° (for the 110 plane).

Accordingly, the average peaks of the four raw materials investigated in the present investigation is detected at 2θ=22.95°±0.35° (for the 200-plane), 2θ=15±0.3 (for the 11$\overline{\phantom{0}}$0 plane), and (for the 110 plane). This similarity in the peaks of the XRD-diffractograms of the four cellulosic materials arisen at the three crystallographic planes (11$\overline{\phantom{0}}$0, 110 and 200) reflects their similarity in composition from cellulose I. These findings agree with those obtained by Goudarzi, A., Lin, L.-T. and Ko, F. K. 2014. *X-Ray diffraction analysis of Kraft lignins and lignin-derived carbon nanofibers*. J. Nanotechnol. Eng. Med., 5 (2): 5 pp. In addition, the average peak for hardwoods is located at 2θ=21.2°±0.15° and for softwood it is located at 2θ=19.35°±0.18°.

Crystallographic properties of Samples. After the determination of the individual crystalline peaks were, the CI was calculated as follows (Hindi, 2017$^c$):

$$CI=[(D_{cr1}+D_{cr2})/D_t]\times 100, \text{ where}$$

$D_{cr1}$ is the crystalline area under the 1$^{st}$ crystalline peak (110 and 11$\overline{\phantom{0}}$0 planes), $D_{cr2}$ represents the crystalline area under the 2$^{nd}$ crystalline peak for the 200 crystallographic plane, and $D_t$ is the whole area under both 1$^{st}$ (110 and 11$\overline{\phantom{0}}$0 planes) and 2$^{nd}$ peaks (200 plane).

Crystallite Size (CS). The CS was calculated using the Scherrer equation [30, 31] as presented below:

$$CS=(57.3k\lambda)/(\beta \cos \theta), \text{ where}$$

CS is the mean width of the crystallite,
k is the form factor of the crystallite (0.94),
λ is the wavelength of X-ray accident to the crystallite (0.1542 nm),
β is the full width at half maximum (FWHM) of the crystalline peak represented to the 200-crystallographic plane,
θ is the Bragg's angle related to the 200-plane.

The constant "57.3" must be multiplied by kλ to transform β from degrees to radians.

Lattice Spacing (d). The d value was calculated using the Bragg's equation as follows:

$$d=n\lambda/2 \sin \theta, \text{ where}$$

n takes a value of "1" for diffractogram with the strongest intensity.

The crystallinity Index ("CI") of the four raw materials (Table 4) was calculated to examine the effect of the delignification method on the quality of the resultant macerated cellulosic fibers. The CI ranged from 59.2% to 77.4%. It is noticed that the CI of the crude raw materials (after the pretreatment process) were lower than those for their cellulosic fibers. This can be attributed to that removing additives, lignin and all amorphous components from the crude materials upon pretreatments and maceration process enhanced the CI property for the macerated cellulosic fibers.

The CIs of the macerated cellulosic fibers lies within the cellulosic resources scale indicating that applying the maceration using the $H_2O_2$ didn't affect their crystallinity.

The obtained CI values agrees with those obtained for cellulose (76.01%) that found by Wulandari, W. T., Rochliadi, A., and Arcana, I. M. 2016. *Nanocellulose prepared by acid hydrolysis of isolated cellulose from sugarcane bagasse*. IOP Conf. Series. Materials Science and Engineering, 107: 012045; wood pine (70%) that indicated by Borysiak, S. and Doczekalska, B. 2005. *X-ray diffraction study of pine wood treated with NaOH*, Fibers and Textiles in Eastern Europe, 5 (53): 87-89, and lies within the CI ranges (41.5% to 95.5%) that shown by Park, S., Baker, J. O., El-Himmell, M., Parilla, P. A., and Johnson, D. K., 2010, Cellulose crystallinity index: Measurement techniques and their impact on interpreting cellulase performance, Biotechnology for Biofuels, 3 (10), DOI: 10.1186/1754-6834-3-10, and that range of 56% to 78% determined by Terinte, N., Ibbett, R., and Schuster, K. C., 2011. *Overview on native cellulose and microcrystalline cellulose I structure studied by X-ray diffraction (WAXD): Comparison between measurement techniques*, Lenzinger Berichte, 89: 118-131 for different cellulosic precursors using different measuring techniques.

In addition, the current CI findings agree with those obtained by Kumar, A., Negi, Y. S., Choudhary, V., Bhardwaj, N. K. 2014, *Characterization of cellulose nanocrystals produced by acid-hydrolysis from sugarcane bagasse as agro-waste*, Journal of Materials Physics and Chemistry, 2 (1): 1-8, where the CI range of the bagasse was between 35.6% to 63.5% due to removal of lignin and hemicelluloses as amorphous part during acid-hydrolysis.

TABLE 4

Mean values[1] of crystallinity Index[2] (CI), crystallite size[3] (CS), and lattice spacing[3] (LS) determined from the XRD-diffractograms for crude and macerated cellulosic fibers from each of recycled cardboards and newspapers.

| Cellulosic Fibers | Crystallographic Properties | | |
|---|---|---|---|
|  | CI % | CS nm | LS nm |
| Crude cardboards after pretreatment | 59.2 | 3.68 | 0.395 |
| Cardboards-based cellulosic fibers after maceration | 63.7 | 4.88 | 0.384 |
| Crude newspapers after pretreatment | 65.1 | 3.87 | 0.388 |
| Newspapers-based cellulosic fibers after maceration | 77.4 | 4.23 | 0.379 |

[1]Each value is an average of 9 samples
[2]The crystallographic planes of 11¯0, 110 and 200 were regarded in calculations.
[3]The crystallographic planes of 200 was regarded only in calculations.

Crystallite Size (CS). The CS is the crystallite thickness estimated by the Scherrer formula for the crystallites having a size less than 100 nm. The CS of the four raw materials (Table 4) ranged from 3.68 nm to 4.88 nm that is slightly smaller than that for cellulose I (about 5 nm in width) as reported by Hindi [Hindi, S. S. Z. 2017[b]. *Nanocrystalline Cellulose: Synthesis from pruning waste of Zizyphus spina christi and characterization*. Nanoscience and Nanotechnology Research. 2017: 4 (3):106-114. doi: 10.12691/nnr-4-3-4; Hindi, S. S. Z. 2017[c]. *Some crystallographic properties of cellulose I as affected by cellulosic resource, smoothing, and computation methods*. International Journal of Innovative Research in Science, Engineering and Technology (IJIR-SET), 6 (1): 732-752. DOI:10.15680/IJIR-SET.2017.061127]. However, the CS values of the material studied were in the normal range belongs to cellulose I. In addition, the CSs of the macerated cellulosic fibers approach to those for their crude materials. This indicates that there is no harmful effect due to maceration by $H_2O_2$ on the cellulosic microstructure.

XRD resolution is not adequate for small crystallites to obtain accurate imagination concerning their lattice structure; Clair et al., 2006. In addition, the CI findings agree with those obtained by Kumar, A., Negi, Y. S., Choudhary, V., Bhardwaj, N. K. 2014, *Characterization of cellulose nanocrystals produced by acid-hydrolysis from sugarcane bagasse as agro-waste*, Journal of Materials Physics and Chemistry, 2 (1): 1-8, for nanocrystalline cellulose and macerated fibers obtained from bagasse (4.2 nm and 3.5 nm, respectively).

Lattice Spacing (LS). The LS of the four cellulosic materials showed that the distance between the strata ranged from 0.395 nm to 0.388 nm (Table 4). Since larger crystal size leads to larger LS between its crystalline strata (Davidson, T., Newman, R. H., and Ryan, M. J. 2004. *Variations in the fibre repeat between samples of cellulose I from different sources. Carbohydrate Research*, 339 (18), 2889-2893, DOI: 10.1016/j.carres.2004.10.005.), the lower LS values can be attributed to the small size of the cellulosic materials crystallite estimated in the present study (3.68-4.88 nm). However, the LS result is slightly smaller than that found by Hindi, S. S. Z., Bakhashwain, A. A. and El-Feel. A. A. 2011. *Physico-chemical characterization of some Saudi lignocellulosic natural resources and their suitability for fiber production*. JKAU; Met. Env. Arid Land Agric. Sci. 21(2): 45-55.

The invention claimed is:

1. A method for delignification of a ligno-cellulosic material comprising:
   blending a ligno-cellulosic material comprising cellulose and lignin with water to form an aqueous liquor,
   contacting the aqueous liquor with hydrogen peroxide under non-alkaline conditions in a reaction column, wherein oxygen generated during said contacting increases internal pressure relative to ambient atmospheric pressure, or increases partial internal O2 pressure relative to ambient partial O2 pressure during said contacting,
   removing dissolved lignin, and
   recovering cellulose;
   wherein a top of the column is closed to atmospheric pressure by a gasket, which gasket retains sufficient oxygen in the column to maintain a higher than atmospheric pressure in the column during said contacting; and
   wherein the gasket comprises a fiber plug or membrane which fits over an open top of the reaction column and prevents escape of sufficient oxygen molecules and oxygen radicals produced by said hydrogen peroxide treatment to enhance efficiency of delinification compared to an otherwise identical method that does not comprise the gasket.

2. The method of claim 1, wherein the ligno-cellulosic material is paper.

3. The method of claim 1, wherein the ligno-cellulosic material is cardboard.

4. The method of claim 1, wherein said contacting occurs in the absence of NaOH or aqueous ammonia.

5. The method of claim 1, wherein said contacting occurs in the absence of chlorine dioxide; or in the absence of methanol, hydrochloric acid and sulfuric acid.

6. The method of claim 1, further comprising contacting the ligno-cellulosic material with hydrochloric acid or another acid to remove calcium carbonate prior to contacting the aqueous liquor with hydrogen peroxide.

7. The method of claim 1, wherein the aqueous liquor contains 0.5 to 5 wt % hydrogen peroxide at a liquid to solid ratio of 10:1 to 20:1.

8. The method of claim 1, wherein the aqueous liquor contains 0.5 to 2 wt % hydrogen peroxide at a liquid to solid ratio of 10:1 to 20:1.

9. The method of claim 1, wherein said oxygen increases the pressure at which said contacting occurs at least 5% above ambient atmospheric pressure.

10. The method of claim 1, wherein said contacting occurs at a temperature ranging from 20 to 100° C.

11. The method of claim 1, wherein said contacting occurs at a temperature ranging from 60 to 80° C.

12. The method of claim 1, wherein said gasket comprises compressed cotton.

13. The method of claim 1, wherein the gasket comprises a woven or nonwoven fiber.

14. The method of claim 1, further comprising repeating the contacting under non-alkaline conditions, removing and/or recovering steps at least once, wherein repeating comprises removing a part of the aqueous liquor containing dissolved lignin and replacing it with a fresh solution containing hydrogen peroxide.

15. The method of claim 1, wherein said contacting occurs at a pressure of at least 15 psia.

16. The method of claim 1, wherein said contacting occurs at a pressure of at least 20 psia.

* * * * *